(12) United States Patent
Ajayaghosh et al.

(10) Patent No.: US 8,323,732 B2
(45) Date of Patent: Dec. 4, 2012

(54) NANOCOMPOSITE MATERIAL USEFUL FOR THE PREPARATION SUPERHYDROPHOBIC COATING AND A PROCESS FOR THE PREPARATION THEREOF

(75) Inventors: Ayyappanpillai Ajayaghosh, New Delhi (IN); Sampath Srinivasan, New Delhi (IN); Vakayil Praveen, New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 129 days.

(21) Appl. No.: 12/678,546

(22) PCT Filed: Aug. 26, 2008

(86) PCT No.: PCT/IN2008/000538
§ 371 (c)(1),
(2), (4) Date: Sep. 2, 2010

(87) PCT Pub. No.: WO2009/037717
PCT Pub. Date: Mar. 26, 2009

(65) Prior Publication Data
US 2010/0330277 A1    Dec. 30, 2010

(30) Foreign Application Priority Data
Sep. 18, 2007    (IN) .......................... 1974/DEL/2007

(51) Int. Cl.
*B05D 1/00*    (2006.01)
*C09D 1/00*    (2006.01)
(52) U.S. Cl. ............... 427/240; 427/421.1; 427/425; 106/287.23; 977/783
(58) Field of Classification Search .............. 427/240, 427/425, 421.1; 106/287.23; 977/783
See application file for complete search history.

(56) References Cited

U.S. PATENT DOCUMENTS 7,411,019 B1 *  8/2008  Bley .............................. 524/847
2010/0283006 A1 * 11/2010  Ajayaghosh et al. ..... 252/301.35

OTHER PUBLICATIONS

Lau, Bico, Teo, Chhowalla, Amaratunga, Milne, McKinley, and Gleason, "Superhydrophobic Carbon Nanotube Forests", Nano Letters, 2003, vol. 3, No. 12, pp. 1701-1705.*
A. Star & Al. : "Preparation and Properties of Polymer Wrapped Singler Walled Carbon Nanotubes," Agnew. Chem. Int. Ed. vol. 40, No. 9, 2001, pp. 1721-1725.
S. J. George et al.: "Self-assembled Nanotapes of Oligo(p-phenylene vinylene)s" Sol-Gel-Controlled Optical Properties in Fluorescent Pi-Electron Gels Chem. Europ. J. vol. 11, 2005, 3217-3227.
S.A. Curran et al. "A Composite from Poly(m-penylenevinylene-co-diocty-p-phenylenevinylene) and Carbon Nanotubes: A Novel Material for Molecular Optoelectronics" Adv. Mater. vol. 10, No. 14, 1998, pp. 1091-1093.

* cited by examiner

*Primary Examiner* — Kirsten Jolley
(74) *Attorney, Agent, or Firm* — Edwards Wildman Palmer LLP; Barry Kramer; Nicholas J. DiCeglie, Jr.

(57) ABSTRACT

The present invention provides nanocomposite materials comprising carbon nanotubes and oligo(p-phenylenevinylene) (OPV). Dispersion of CNT in the solution of solution of oligo(p-phenylenevinylene) (OPV) in organic solvent results in the formation of nanocomposite material. The π-π interaction between CNT and OPV molecule were shown by spectroscopic and microscopic techniques. The nanocomposite solution can be drop casted over glass or metallic surface for the preparation of superhydrophobic coating. The resultant composite surface shows superhydrophobic nature even with corrosive liquids and its contact angle is almost constant even after prolonged contact with water.

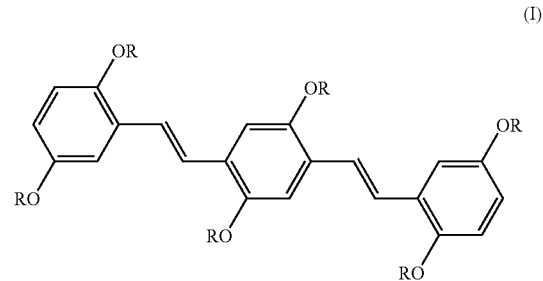

(I)

12 Claims, 9 Drawing Sheets

FIG. 1

OPV (Formula 1, R = C₁₆H₃₃)

NANOCOMPOSITE MATERIAL USEFUL FOR THE PREPARATION SUPERHYDROPHOBIC COATING AND A PROCESS FOR THE PREPARATION THEREOF

FIELD OF THE INVENTION

The present invention relates to a nanocomposite material useful for the preparation of superhydrophobic coatings on the surface of a substrate. More particularly, the present invention relates to a nanocomposite material comprising Carbon Nanotube (CNT) and oligo(p-phenylenevinylene) (OPV) of general formula Formula 1. The present invention also relates to a process for the preparation of nanocomposite material comprising Carbon Nanotube (CNT) and oligo(p-phenylenevinylene) (OPV) of general formula Formula 1.

Formula 1 wherein R = $C_{16}H_{33}$ or $C_{12}H_{25}$ or $C_8H_{17}$

BACKGROUND OF THE INVENTION

Many of the plants in nature, such as lotus, taro, and haulm leaves, exhibit the unusual wetting characteristic of superhydrophobicity. A superhydrophobic surface is one that can cause water droplets to bead off completely. Such surfaces exhibit water droplet with advancing contact angle of 150° or higher. In addition the contact angle hysteresis can be very low (the receding contact angle is within 5° of the advancing contact angle), producing a surface on which water droplets simply roll off. A self-cleaning surface results since the rolling water droplets remove dirt and debris. The lotus leaf accomplishes this effect through the use of a surface topography that present two different length scales to the outside environment. The surface of the lotus leaf for example, is textured with 3-10 micron-sized hills and valleys that are decorated with nanometer-sized particles of a hydrophobic wax like material. The hills and valleys insure that the surface contact area available to water is very low while the hydrophobic nanoparticles prevent penetration of water into the valleys. The net result is that water cannot wet the surface and therefore forms nearly spherical water droplets, leading to superhydrophobic surfaces.

Inspired by nature's self-cleaning superhydrophobic surfaces with contact angles (CA) larger than 150° and sliding angle<5° have attracted great interest over the last few years for both fundamental research and practical applications. For instance, they can be effectively used for textiles, traffic signs, hulls of ships, tubes or pipes, building glass, windshields of cars, satellite antenna, and conductors with a self cleaning surface. These surfaces usually have binary structures at both micrometer and nanometer scales, which makes it possible to trap a large amount of air and to minimize the real contact area between surface and water droplets. Reference may be made to Sun, T., et al. Angew. Chem., Int. Ed. 2004, 43, 1146; Feng, L., et al. Angew. Chem., Int. Ed. 2003, 42, 4217; Guo, Z., Zhou, F., Hao, J., Liu, W., J. Am. Chem. Soc. 2005, 127, 15670.

Superhydrophobic materials have high surface roughness which can be created by following certain techniques, one such example is Chemical Vapor Deposition (CVD). For example a technique for depositing thin layer of low surface energy materials is hot-filament chemical vapor deposition (HFCVD) which allows coating of objects with complex shape and nanoscale features. This technique can be used to deposit thin layers of a variety of polymers, including low surface energy polymers such as polytetrafluoroethylene. For further informations, see, e.g., United States Patent Application No. 2003/0138645 to Gleason et al.; K. K. S. Lau et al., "Hot-Wire Chemical Vapor Deposition (HECVD) of Fluorocarbon and Organosilicon Thin Films," Thin Solid Films, 2001, 395, 288-291.

Other methods for surface roughening are based on lithographic techniques in which a mask with desired feature is formed over the material to be modified and then the material is etched through the space in the mask. For example the use of photolithographic technique to prepare rough surface, see e.g., Jai Ou et al, "Laminar drag reduction in microchannels using ultraphobic surfaces," Physics of Fluids, Vol. 16, no. 12, December 2004.

The creation of hydrophobic sol-gel with high contact angles have been reported by the use of various organosilane compounds see, e.g., A. V. Rao et al., "Comparative studies on surface modifications of silica areogel based on various organosilane compounds of the type $R_nSiX_{4-n}$," Journal of Non-crystalline Solids, 2004, 350, 216-223.

Synthetic superhydrophobic surfaces have been fabricated through various approaches. A superhydrophobic surface is a surface that has a water droplet advancing contact angle of 150° or higher and the receding contact angle is with in 5° of the advancing contact angle and very low sliding angle. Some of the general strategies employed for the formation of CNT based superhydrophobic surfaces involve aligned CNT which were prepared through sophisticated techniques like plasma enhanced chemical vapor deposition and carbon nanofiber based superhydrophobic surfaces prepared by pyrolysis method. Reference may be made to Li, S., et al. J. Phys. Chem. B 2002, 106, 9274; Liu, H., et al. Angew. Chem. Int. Ed. 2004, 43, 1146; Lau, K. K. S., et al. Nano Lett. 2003, 3, 1701; Huang, L., et al. J. Phys. Chem. B. 2005, 109, 7746; Feng, L., et al. Angew. Chem., Int. Ed. 2003, 42, 4217; Zhu, Y., et al. Chem Phys Chem 2006, 7, 336.

Surfaces which show superhydrophobic nature with corrosive liquids such as acidic and basic solutions are very important but rare, only few reports pertaining to this aspect is known in literature. Most of the superhydrophobic surface is demonstrated with pure water. It is essential to prepare superhydrophobic surfaces which have little or no effect due to the change in the pH environment. Reference may be made to Feng, L., et al. Angew. Chem., Int. Ed. 2003, 42, 4217; Guo, Z., Zhou, F., Hao, J., Liu, W., J. Am. Chem. Soc. 2005, 127, 15670.

One specific example for creating medical devices which have reduced resistance to movement of adjacent materials, including both fluid flow and solids can be seen in USPA: 2007/0005024. One specific example for micro fluidic device useful in industries for creating channels with predictable and optimal level of fluid flow resistance can be seen in U.S. Pat. No. 6,923,216. One specific example for creating superhydrophobic surfaces using silicon nanofibre constructed by gold colloid initiated chemical vapor deposition process, in that fluorinated nanowire surfaces have high contact angle, Reference may be made to US: 2005/0181195.

Synthetic procedures to construct individual nanostructures on surfaces and in bulk are described for "Single-Walled Carbon Nanotubes," Chem. Phys. Lett. 1998, 292, 567-574. Of course, the current invention is preferably done using different method of construction but the material used etc. may overlap.

Superhydrophobic surfaces with CNT based composites are important because the field of CNT has created broad interest and numerous theoretical and experimental studies which reveal interesting chemical and physical properties for CNT based materials. They find application in organic light emitting diodes, optoelectronic and photovoltaic devices, sensors, field-emission device, logic gates, probes in chemistry and biology. It has been shown that the composite of π-conjugated molecules and CNT have promises for application in photovoltaic device, OLED, solar cells owing to the novel electronic interaction between these two elements. Reference may be made to Guldi, D. M., Rahman, G. M. A., Zerbetto, F., Prato, M., *Acc. Chem. Res.* 2005, 38, 871; Rahman G. M. A., et al. *J. Am. Chem. Soc.* 2005, 127, 10051; Ago, H., Petritsch, K., Shaffer, M. S. P., Windle, A. H., Friend, R. H., *Adv. Mater.* 1999, 11, 1281.

Accordingly this invention deals with Formula 1, which is an oligomer of poly(p-phenylenevinylene) polymer, the interaction of Formula 1 with carbon nanotubes are unknown and also invention deals with the creation of superhydrophobic coatings using nanocomposite material.

Oligo(p-phenylenevinylene) derivatives are known to form self-assembled structures under different conditions, reference can be made to A. Ajayaghosh et al., *J. Am. Chem. Soc.* 2001, 123, 5148-5149., and A. Ajayaghosh et al., *Angew. Chem. Int. Ed.* 2006, 45, 1141. Interaction of conjugated polymers with carbon nanotubes and their characterization can be seen through the following references, A. Star et al., *Adv. Mater.* 2001, 13, 899, and S. Curran et al., *Syn. Met.* 1999, 103, 2559.

Despite the above informations, a simple and viable solution processable carbon nanotube based superhydrophobic coating is not known.

OBJECTIVES OF THE INVENTION

The main object of the present invention is to provide a nanocomposite material useful for the preparation of superhydrophobic coatings on the surface of a substrate.

Another object of the present invention is to provide a nanocomposite material capable of forming a superhydrophobic coating having the contact angles higher than about 140-160° with low sliding angle and the receding contact angle with in 5° of the advancing contact angle.

Yet another object of the present invention is to provide superhydrophobic coating of nanocomposite material having higher hydrophobicity and water repellent properties and excellent resistance.

Yet another object is to disperse CNT in common organic solvent with the aid of OPV derivative through supramolecular interaction.

Yet another object is to provide an easy method for the stable dispersion of CNT in organic and hydrocarbon solvents with the aid of OPV molecules.

Still another object of the present invention is to provide a process for the preparation of nanocomposite material capable of forming a superhydrophobic coating.

SUMMARY OF THE INVENTION

According the present invention provides nanocomposite material useful for superhydrophobic coating comprising carbon nanotube (CNT) and oligo(p-phenylenevinylene) (OPV) of general formula 1.

Formula 1 wherein R = $C_{16}H_{33}$ or $C_{12}H_{25}$ or $C_8H_{17}$

In an embodiment of the present invention the nanocomposite materials prepared have the following characteristics:
a) solid to liquid phase transition temperature is in the range of 110°-115° C.;
b) liquid to solid phase transition temperature is in the range of 96°-98°C.;
c) contact angle in nanocomposite superhydrophobic coating with water or other corrosive liquid is in the range of 150°-167°.

In yet another embodiment the carbon nanotubes used are multi-walled carbon nanotube having diameter in the range of 110-170 nm.

In yet another embodiment the oligo(p-phenylenevinylene) (OPV) used is selected from the group consisting of 2,2-(1E,1'E)-2,2'-(2,5-bishexadecyloxy)-1,4-phenylene)bis(ethene-2,1-diyl)bis(1,4-bis(hexadecyloxy)benzene (OPV ($C_{16}H_{33}$), 2,2-(1E,1'E)-2,2'-(2,5-bisdodecyloxy)-1,4-phenylene)bis(ethene-2,1-diyl)bis(1,4-bis(dodecyloxy)benzene (OPV($C_{12}H_{25}$) and 2,2-(1E,1'E)-2,2'-(2,5-bisocytyloxy)-1,4-phenylene)bis(ethene-2,1-diyl)bis(1,4-bis(octyloxy)benzene (OPV($C_8H_{17}$).

The present invention further provides a process for the preparation of nanocomposite material useful for superhydrophobic coatings, the said process comprising the steps of:
i) preparing a solution of oligo(p-phenylenevinylene) (OPV) of general formula 1 in an organic solvent under heating, at a temperature in the range of 35°-45° C., Formula 1 wherein R = $C_{16}H_{33}$ or $C_{12}H_{25}$ or $C_8H_{17}$ ii) dispersing the carbon nanotubes into the above said solution of oligo(p-phenylenevinylene) (OPV) obtained in step (i) by sonication, followed by the centrifugation of the resultant suspension and decanting the resultant supernatant liquid, iii) applying vacuum to the above said supernatant liquid obtained in step (ii) at a temperature of 20°-30° C. to obtain the solid nanocomposite material.

iv) dispersing the above said nanocomposite material in an organic solvent and v) spin coating or drop casting of the above said dispersion solution of nanocomposite material over the surface of a substrate to obtain the desire superhydrophobic coating.

In yet another embodiment the carbon nanotubes used in the process are multi-walled carbon nanotubes having diameter in the range of 110-170 nm.

In yet another embodiment the oligo(p-phenylenevinylene) (OPV) used in the process is selected from the group consisting of 2,2-(1E,1'E)-2,2'-(2,5-bishexadecyloxy)-1,4-phenylene)bis(ethene-2,1-diyl)bis(1,4-bis(hexa decyloxy) benzene (OPV($C_{16}H_{33}$), 2,2-(1E,1'E)-2,2'-(2,5-bisdodecyloxy)-1,4-phenylene)bis(ethene-2,1-diyl)bis(1,4-bis (dodecyloxy)benzene (OPV($C_{12}H_{25}$) and 2,2-(1E, 1'E)-2,2'-(2,5-bisocytyloxy)-1,4-phenylene)bis(ethene-2,1-diyl)bis(1, 4-bis(octyloxy)benzene (OPV($C_8H_{17}$).

In yet another embodiment the organic solvent used is selected from aliphatic and aromatic hydrocarbon solvents.

In yet another embodiment the hydrocarbon solvent used is selected from the group consisting of hexane, decane, petrol, diesel and kerosene.

In yet another embodiment the organic solvent used is preferably selected from chloroform and toluene.

In yet another embodiment the weight ratio of oligo(p-phenylenevinylene) (OPV) to carbon nanotubes used is in the range of 40-60 wt %.

In yet another embodiment the substrate used for coating is selected from the group consisting of metallic, glass, mica, ceramics, semi-conducting materials and combination thereof.

DETAILED DESCRIPTION OF THE INVENTION

In order to facilitate a better understanding of the invention a detailed description of the preferred embodiments of the present invention will now be explained with reference to the accompanying drawings. It should be understood that the disclosed embodiments are merely exemplary of the invention, which may be embodied in various forms. Therefore the details disclosed herein are not to be interpreted as limiting but merely as the basis for the claims and as a basis for teaching one skilled in the art how to make or use the invention.

The process and preparation of nanocomposite material for superhydrophobic coatings are as follows.

Process for the Development of Superhydrophobic Coatings

Superhydrophobic carbon nanotube coatings can be achieved by following the procedure as outlined below. OPV/CNT composite solutions were prepared by dissolving OPV (4-6 mg) in common organic solvents like chloroform (10 mL) by heating around 40° C. Then the OPV solution was added to a round bottom flask (25 mL) with CNT (4-6 mg) and sonicated for 30 minutes at 20-30° C. in a low power water bath sonicator. Then the OPV/CNT suspension was centrifuged at 3000 rpm for 15 minutes at 20-30° C. and two-third of the supernatant liquid was decanted carefully from the settled solid and the resultant solution was stable for days; no subsequent settling of material has been observed during this period. Solid composite material was prepared by removing solvent at 20-30° C. by applying high vacuum; the resultant oligomers bounded nanotube composite was soluble in common organic solvents, including aliphatic hydrocarbon solvents including petrol, diesel and kerosene. Composite solution can be prepared by dissolving solid composite (1-10 mg) in common organic solvents (10 mL) like chloroform, toluene, hexane, decane etc.

Initially substrates like metallic plates or glass plates were cleaned with solvents like chloroform or acetone by sonicating in a low power bath sonicator and then washed once again with fresh aliquots of solvents and dried in a vacuum oven for 1 hour at 80-90° C. Freshly cleaved mica wafer or cleaned metallic or glass plates were mounted on a fixed platform or on a spin coating apparatus and then composite solution was drop casted or spin coated by allowing the solution to flow drop by drop on the substrate with a flow rate of 1-2 mL/min. Prior to the contact angle measurements composite coated substrates were placed in a vacuum chamber for 12 hours at 20-30° C.

The following examples are given by the way of illustration and therefore should not construed to limit the scope of the invention

Example 1

Preparation of Nanocomposite Material and Characterization by Spectroscopic Studies OPV/CNT composite solutions were prepared by dissolving OPV (4-6 mg) (40-60 wt %) in chloroform (10 mL) by heating around 40° C. Then the OPV solution was added to a round bottom flask (25 mL) with CNT (4-6 mg) (40-60 wt %) and sonicated for 30 minutes at 20° C. in a low power water bath sonicator. Then the OPV/CNT suspension was centrifuged at 3000 rpm for 15 minutes at 20° C. and two-third of the supernatant liquid was decanted carefully from the settled solid and the resultant solution was stable for days; no subsequent settling of material has been observed during this period. Solid composite material was prepared by removing solvent at 20° C. by applying high vacuum; the resultant oligomers bounded nanotube composite was soluble in common organic solvents, including aliphatic hydrocarbon solvents including petrol, diesel and kerosene.

Figure 1:
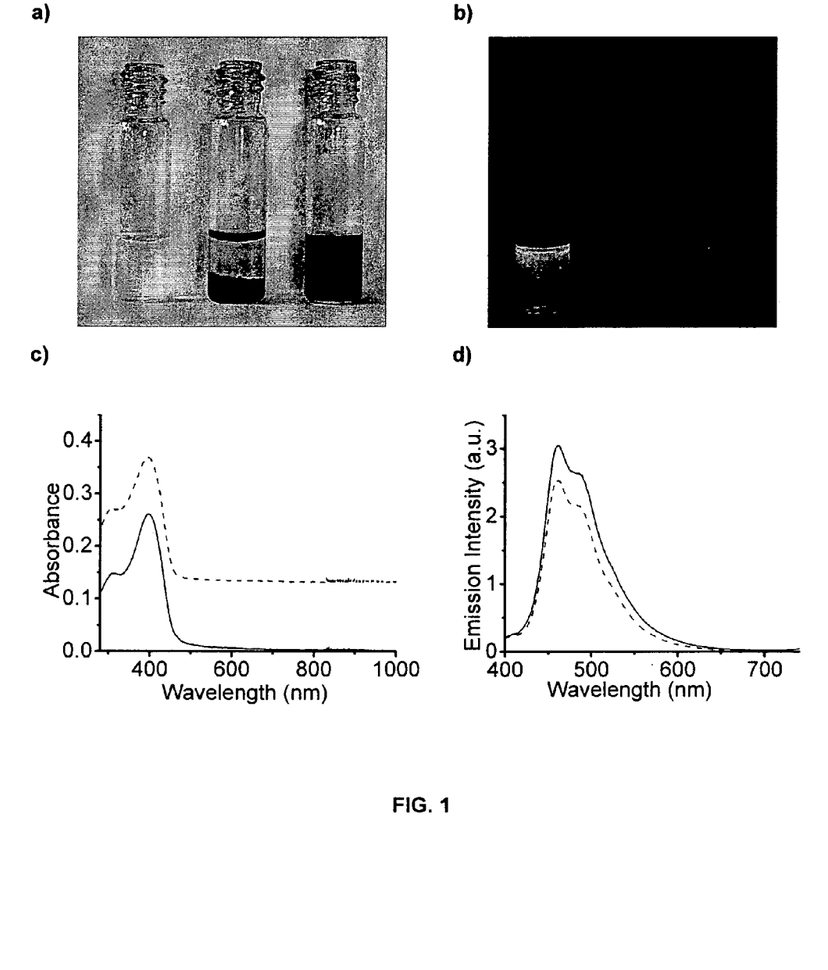
FIG. 1 shows optical characterization of CNT solutions: (a) Photograph of OPV (Formula 1, R=$C_{16}H_{33}$), CNT dispersed in $CHCl_3$ without OPV and with OPV (From left to right). (b) Photograph of all the three vials in the same order under UV light, ($\lambda_{ex}$=365 nm). (c) Absorption and (d) emission spectra ($\lambda_{ex}$=380 nm) of OPV [1×10$^{-4}$ M] (blue —) and CNT/OPV dispersed in $CHCl_3$ (red ----). Excitation wavelength is 390 nm.

In the present invention, oligo(p-phenylenevinylene) backbone will interact with the frame work of CNT and the six alkoxy side chains will interact with the solvent molecules that facilitate the stable dispersion of CNT in common organic and hydrocarbon solvents. The OPV solution in chloroform is yellow in color while it is changed to green in the presence of nanotubes. OPV/CNT solution in chloroform appeared to be quite clear, transparent and homogeneous (FIG. 1a). Under UV illumination ($\lambda_{ex}$=365 nm), composite solution shows a different emission color when compared with the blue emission of OPV in $CHCl_3$, which is due to the absorption by CNT in the visible region (FIG. 1b). The optical absorption spectra of OPV in $CHCl_3$ with $\lambda_{max}$=398 nm while the composite solution show absorption between 400 to 1000 nm which indicates the presence of OPV wrapped CNT in the solution (FIG. 1c). FIG. 1d shows the emission spectra of OPV before and after loading with CNTs, the marginal decrease in OPV emission intensity in the presence of CNT may be due to absorption, quenching and scattering by the nanotubes. The above mentioned observations reveal that the excited states of the OPV are not significantly affected by the presence of CNT.

Figure 2:
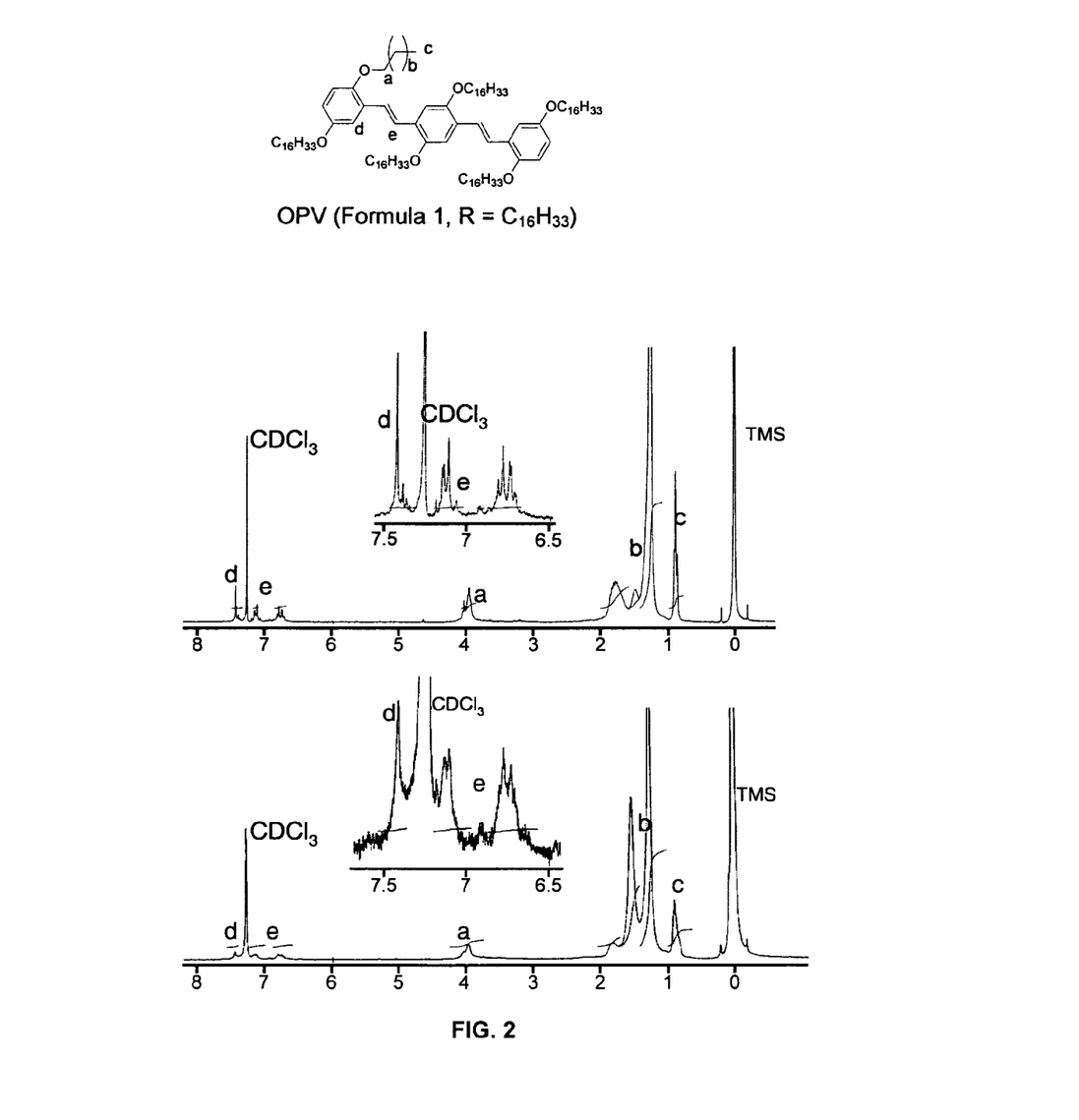
FIG. 2 shows $^1$H NMR spectra of (top) OPV (Formula 1, R=$C_{16}H_{33}$), with expanded aromatic region (inset) and (bottom) OPV (Formula 1, R=$C_{16}H_{33}$)/CNT composite with expanded aromatic region (inset) in $CDCl_3$.

The $^1$H NMR (300 MHz/TMS standard/$CDCl_3$) spectrum of the OPV (Formula 1, R=$C_{16}H_{33}$)/CNT composite reveals (FIG. 2 bottom) significant broadening and very small shift in the resonance peak of the oligomer protons. This broadening arises most likely from the presence of the conducting CNT as well as from the catalytic impurities present along with CNT depending upon the preparation conditions of CNTs. However, this broadening is not completely regular, which indicates that some chemical information is retained in the spectra of the composite. For example, the signals for the aromatic and vinyl protons on the OPV as well as the protons of the side chain that are closest to the aromatic groups are the most broadened features. In addition, the peak intensities corresponding to the protons on the hexadecyloxy chains that are closest to the aromatic rings are greatly reduced relative to those of the protons that are toward those middle or terminus of those chains, similar phenomena have been observed previously. Such arrangement leaves the side chain attached to the oligomers able to wiggle around in solution. Reference may be made to Star, A., et al. *Angew. Chem., Int. Ed.* 2001, 40, 1721.

Figure 3:
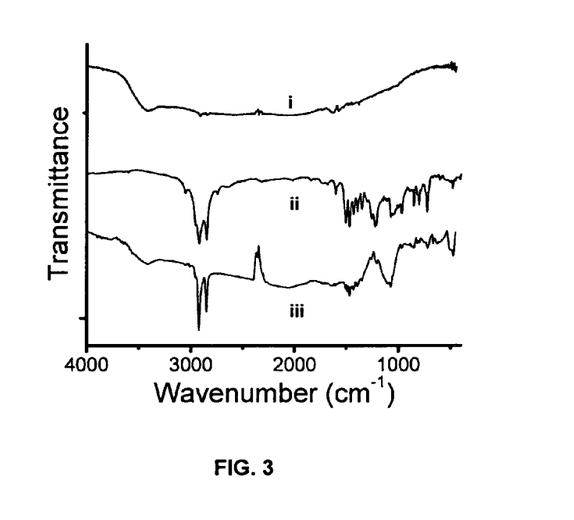
FIG. 3 shows FT-IR spectra of (i) CNT, (ii) OPV (Formula 1, R=$C_{16}H_{33}$) and (iii) OPV/CNT composite.

The distinct feature of FT-IR spectrum of CNT is the C-H stretching mode at 2921 $cm^{-1}$ and 2852 $cm^{-1}$ and C=C stretching vibration of the CNT back bone at 1580 $cm^{-1}$ (FIG. 3a). FT-IR spectrum of OPV (Formula 1, R=$C_{16}H_{33}$) shows peaks at 2918 and 2848 $cm^{-1}$ corresponding to C-H stretching vibration, C=C stretching mode at 1601 $cm^{-1}$, and bending modes at 1068, 840, 800, and 721 $cm^{-1}$ (FIG. 3b). The presence of CNT made significant change in the overall spectrum of OPV, the peaks at 2920, 2850, and 1465 $cm^{-1}$ might arise from the overlapping of the features of MWCNT and OPV as the positions of these peaks are close to those of CNT and OPV. The C-H wagging band at 1258 $cm^{-1}$ in OPV disappeared completely after the interaction with CNT, implying that this vibration has been seriously broadened by the strong interaction with the CNT surface (FIG. 3c). These results suggest that the interaction between adsorbed OPV and CNT is strong and noncovalent. Reference may be made to Zhang, J., Lee, J. K., Wu, Y., and Murray, R. W., *Nano Lett.* 2003, 3, 403.

Example 2

Characterization by Thermal Studies

Figure 4:
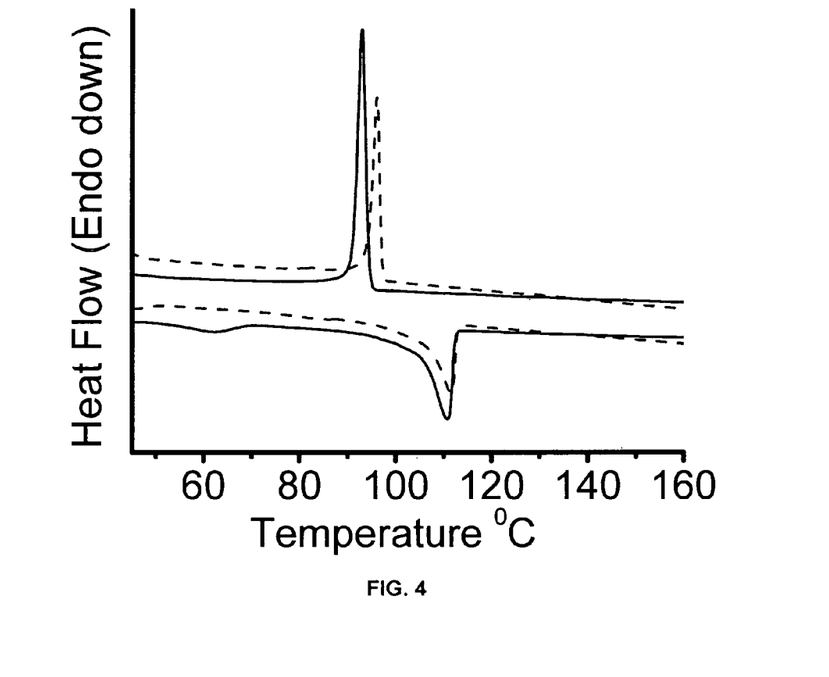
FIG. 4 shows DSC curves of OPV (Formula 1, R=$C_{16}H_{33}$), (blue —) and OPV (Formula 1, R=$C_{16}H_{33}$)/CNT composite (red ----).

Differential Scanning Calorimetric (DSC) analysis shows strong interaction between OPV and CNT. Pristine OPV (Formula 1, R=$C_{16}H_{33}$) shows melting at 110° C., while in the presence of CNT the melting occurs at higher temperature, 111° C. (FIG. 4). The adsorption of OPV on the surface of CNT restricts the free movement of the OPV molecules and eventually it will result in higher energy for phase transition from solid to liquid. At the same time the phase transition from liquid to solid state arises at higher temperature (96° C.) for CNT/OPV composite, when compared with OPV (93° C.) and it may be due to CNT mediated crystallization of OPV. Transition in OPV around 63° C. is completely disappeared in the presence of CNT, these things shows that the strong interaction between CNT and OPV makes significant change in the DSC. Reference may be made from Yang, Y., Xie, X., Wu, J., Mai, Y, W., *J. Polym. Sci., Part A: Polym. Chem.* 2006, 44, 3869.

Figure 5:
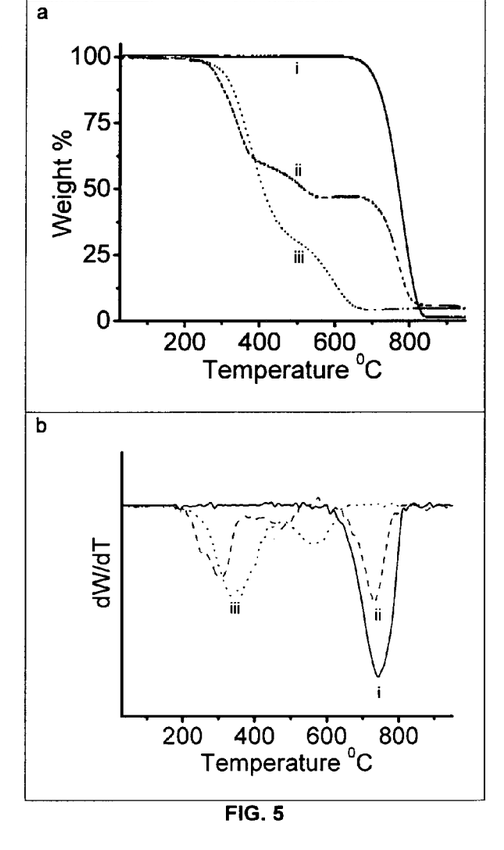
FIG. 5 shows (a) TGA (b) DTA curves of (i) CNT (black —), (ii) OPV (Formula 1, R=$C_{16}H_{33}$)/CNT composite (red ----) and (iii) OPV (Formula 1, R=$C_{16}H_{33}$) (blue ·····).

In order to obtain additional information on the π-π interaction and thermal stability of the composite, TGA was performed under air at a heating rate of 10° C./min and DTA curves obtained from TGA studies. FIG. 5a shows the pyrolysis temperature (565° C.) attains a plateau region for composite, which is lower than that of the OPV (685° C.). The onset decomposition temperature of OPV (Formula 1, R=$C_{16}H_{33}$) in composite is at lower temperature (210° C.) FIG. 5b and in the absence of CNT it is relatively at higher temperature (233° C.). These observations reveal that the stability of the OPV molecules anchored on the CNT is lower, which means, the internal energy of the adsorbed OPV molecules increased because of its π-π interaction with the CNT. We attribute the phenomenon to the twist of the molecular configuration of the OPV to a small extend, to match well with the cylindrical structure of the CNT and thus firmly immobilize OPV on the surface of CNT. It is only structural twist that results in the increase in the internal energy of the OPV molecules results in the decrease in the pyrolysis temperature. Reference may be made from Yang, Y., Xie, X., Wu, J., Mai, Y, W., *J. Polym. Sci., Part A: Polym. Chem.* 2006, 44, 3869.

Example 3

Characterization by XRD and Contact Angle Studies

Figure 6:
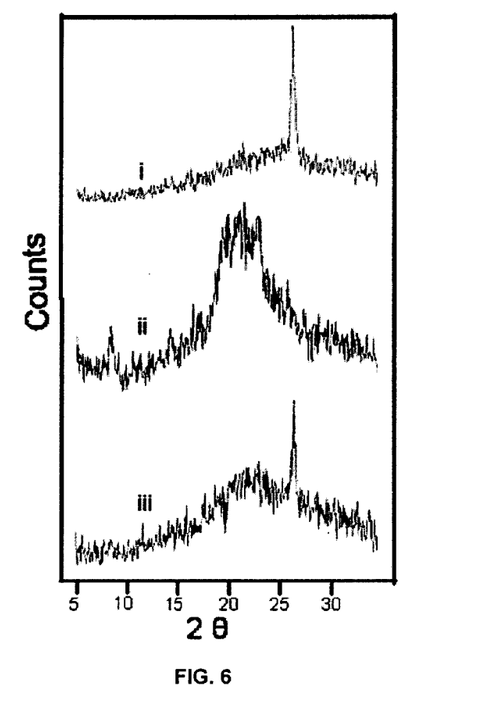
FIG. 6 shows X-ray diffraction patterns of (i) CNT, (ii) OPV (Formula 1, R=$C_{16}H_{33}$), and (iii) OPV (Formula 1, R=$C_{16}H_{33}$)/CNT composite.

Thin film of OPV, CNT and OPV/CNT composite were prepared by evaporating chloroform from their respective solutions at room temperature. X-ray diffraction patterns of thin film of OPV (Formula 1, R=$C_{16}H_{33}$) shows characteristic π-π stacking features of OPV molecules at 4.56 Å and 3.87 Å (FIG. 6ii), The XRD pattern of the composite exhibits Bragg reflection at 2θ=26.4° (FIG. 6iii) corresponding to the inter-shell spacing (3.37 Å) of the concentric cylinders of graphitic carbon which can be seen from CNT, XRD pattern in FIG. 6i. Reference may be made to Tang B. Z., and Xu, H., *Macromolecules* 1999, 32, 2569.

Figure 7:
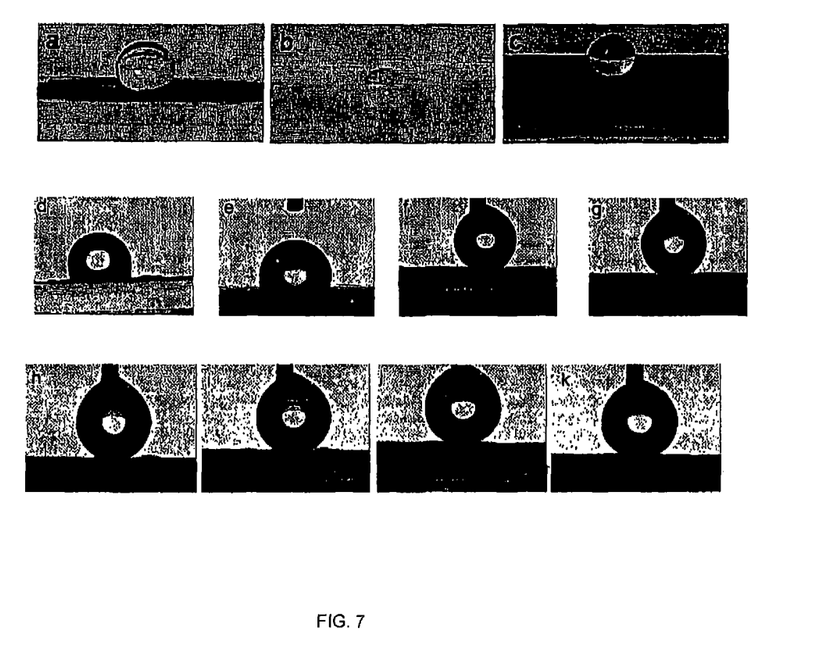
FIG. 7 shows optical image of water drops on (a) CNT, (b) OPV (Formula 1, R=$C_{16}H_{33}$) and (c) composite, (d), and (e) shows the water contact angle of CNT (128°) and OPV (106°) (Formula 1, R=$C_{16}H_{33}$), (f), (h) and (j) shows advancing contact angle on composite surfaces OPV Formula 1, R=$C_{16}H_{33}$, $C_{12}H_{25}$, and $C_8H_{17}$ with 165°, 164° and 163° respectively, (g), (i) and (k) shows receding contact angle on composite surfaces OPV Formula 1, R=$C_{16}H_{33}$, $C_{12}H_{25}$, and $C_8H_{17}$ with 164°, 162° and 162° respectively.

Optical images of water drop on CNT, OPV (Formula 1, R=$C_{16}H_{33}$) and composite, were shown in FIG. 7a, b and c. The water contact angle of CNT (128°±5°) and OPV (106°±3°) (Formula 1, R=$C_{16}H_{33}$), were shown in FIG. 7(d) and (e) respectively. FIGS. 7(f), (h) and (j) shows advancing contact angle on composite surfaces OPV Formula 1, R=$C_{16}H_{33}$, $C_{12}H_{25}$, and $C_8H_{17}$ with 165°±2°, 164°±2° and 163°±2° respectively, and FIG. 7(g), (i) and (k) shows and receding contact angle on composite surfaces OPV Formula 1, R=$C_{16}H_{33}$, $C_{12}H_{25}$, and $C_8H_{17}$ with 164°±2°, 162°±2° and 162°±2° respectively.

Composites with different weight percentage of CNT can be prepared by dispersing the required amount of CNT in the OPV chloroform solution by sonication and evaporating the solvent over glass or metallic surface to get the thin film surface. Although the films of CNT and OPV are hydrophobic, water droplets on these surfaces show low advancing and receding angles. In the case of the unmodified CNT, the water droplets slowly penetrate into the film eventually wetting the surface.

Figure 8:
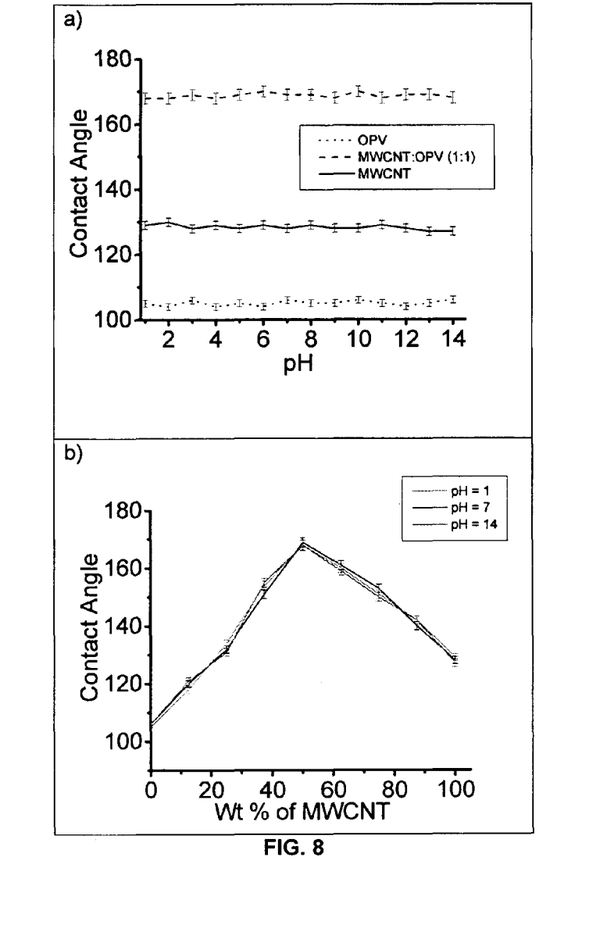
FIG. 8 (a) The relationship between pH and contact angle on (i) composite surface (1:1) (ii) CNT, and (iii) OPV (Formula 1, R=$C_{16}H_{33}$), (b) Relationship between the water contact angle and CNT content in composite.

FIG. 8a shows the relationship between contact angle (CA) and pH on the CNT, OPV (Formula 1, R=$C_{16}H_{33}$) and composite surface. CA on these surfaces remains unchanged within the experimental error (±2°) when the pH varied from 1 to 14 (FIG. 7d), that is, the CAs are larger than 150° for not only water but also corrosive liquids, such as acidic and basic aqueous solutions. FIG. 8b shows the relationship between the CNT content in the composite film and the CA for water on the corresponding composite film, which clearly demonstrates that the CA increases with increase in the content of CNT in the composite and reaches 165° for 50 wt % of CNT. Further increase in CNT content in the composite results in decrease in CA. The decrease in the content of the OPV results in the increase in the content of the naked CNT which is reflected in the decrease of hydrophobic nature of composite film.

Figure 9:
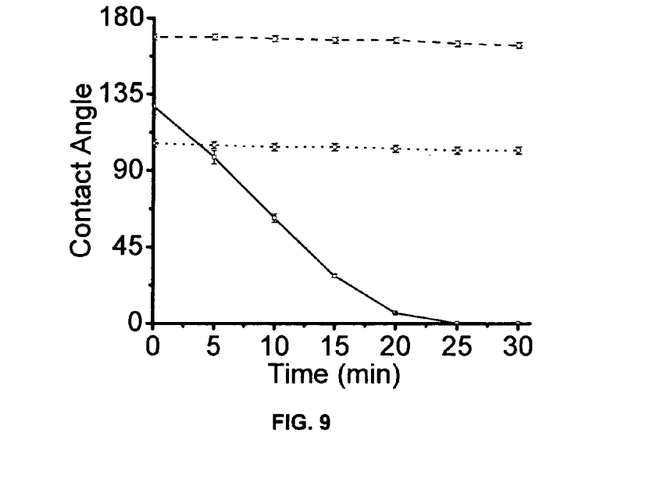
FIG. 9 shows Time dependence of water contact angle for composite (1:1) (red --), OPV (Formula 1, R=$C_{16}H_{33}$) (blue ·····) and CNT (black —).

FIG. 9 shows the time dependence of water contact angle for the OPV (Formula 1, R=$C_{16}H_{33}$), CNT and composite (1:1) coating. It is observed that the water CA of CNT coating decreases linearly with time, from an initial value of 128° to 0° within 20 min. However the CA of the composite film remains constant even after 24 hrs continuous treatments with water, showing a stable superhydrophobicity (CA>150°). Since the composite forms a well packed surface ensures water will not seep in to the CNTs.

Example 4

Characterization by Morphological Studies

Figure 10:
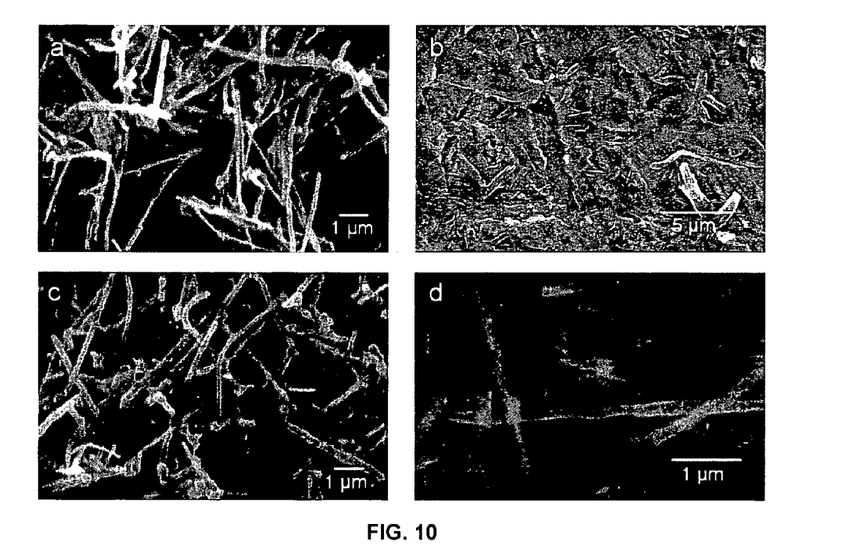
FIG. 10 shows SEM images of (a) CNT (b) OPV (Formula 1, R=$C_{16}H_{33}$), (c) and (d) OPV (Formula 1, R=$C_{16}H_{33}$)/CNT complex.

Adsorption of the OPV results in a "hairy" nanotube surface with a subnanoscopic hydrocarbon coating on the outer wall of the CNT (FIGS. 10c and d) resulting in a surface with micro rough overall morphology. FIGS. 10a and b are films of CNT and OPV respectively. To thoroughly understand the superhydrophobic surface, theoretical considerations are necessary. The CA on a composite surface ($θ_r$) can be expressed by modified Cassie's equation (1). Here $θ_r$ and θ are the contact angles on the composite (rough) and OPV (smooth) surface, respectively; $f_1$ is the fraction of solid/water interface, while $f_2$ is that of the air/water interface, (i.e., $f_1+f_2=1$) indicates that, when a rough surface comes in contact with water, air trapping in the trough area may occur, which would contribute greatly to the increase of hydrophobicity.

$$\cos θ_r = f_1 \cos θ - f_2 \quad (1)$$

According to the equation (1), the $f_2$ value of the composite surface estimated to be 0.954 by using the contact angle values obtained which indicates that the fraction of the air in the surface is very high. Reference may be made from Feng, L., et al. *Angew. Chem., Int. Ed.* 2002, 41, 1221.

Water droplets roll on composite surface much more readily when compared to CNT and OPV surfaces. This is explained by their difference in contact angle hysteresis; the force required to move the droplets is F~$γ_{LV}$(cos $θ_R$−cos $θ_A$), and the values of cos $θ_R$−cos $θ_A$ for CNT, OPV, and composite are 0.44, 0.24 and 0.01, respectively. It thus takes about 44 times and 24 times as much force, 31.82 and 17.38 vs 0.69 dyn/cm, on CNT and OPV than on composite.

Figure 11:
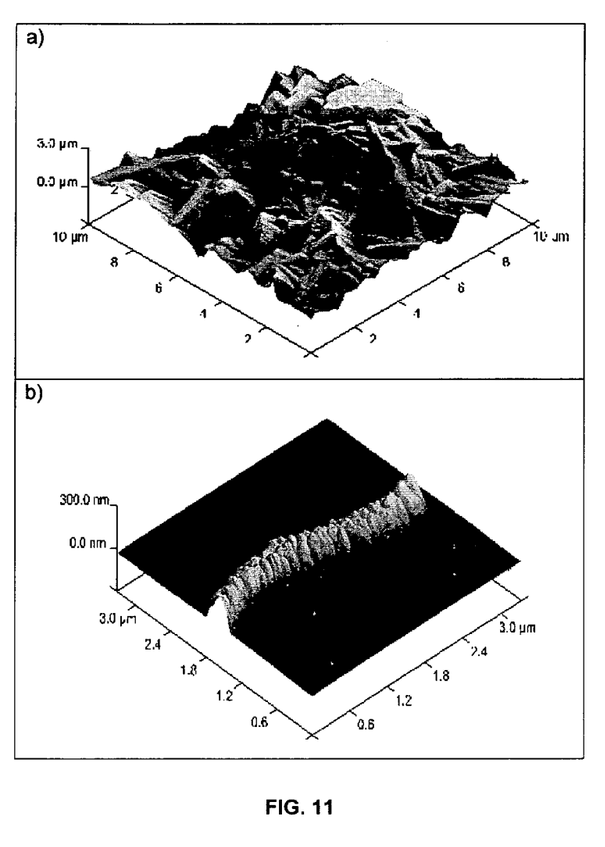
FIG. 11 shows AFM images of (a) superhydrophobic surface (b) OPV (Formula 1, R=$C_{16}H_{33}$) modified CNT.

FIG. 11a shows the AFM image of superhydrophobic surface and FIG. 11b shows the OPV (Formula 1, R=$C_{16}H_{33}$) modified individual CNT. These images shows the strong interaction between carbon nanotubes and OPV molecules, the height variation along CNT surface shows the adsorption of OPV molecules over the nanotube surface. The roughness from micrometer level to nanometer level results in the superhydrophobic nature of the composite surface. Characterization data of nanocomposite material in tabular form.

Table 1 shows FT-IR characterization data of CNT, OPV (Formula 1, R=$C_{16}H_{33}$) and OVP/CNT composite

| FT-IR | CNT | OPV | COMPOSITE |
| --- | --- | --- | --- |
| C—H stretching mode | 2921, 2852 cm$^{-1}$ | 2918, 2848 cm$^{-1}$ | 2920, 2850 cm$^{-1}$ |
| C=C stretching vibration | 1580 cm$^{-1}$ | 1601 cm$^{-1}$ | 1465 cm$^{-1}$ |
| C—H wagging band | — | 1258 cm$^{-1}$ | Disappeared |

Table 2 shows DSC characterization data of OPV (Formula 1, R=$C_{16}H_{33}$) and OVP/CNT composite

| DSC phase transition | OPV | COMPOSITE |
| --- | --- | --- |
| solid to liquid | 110° C. | 111° C. |
| liquid to solid | 93° C. | 96° C. |

Table 3 shows water contact angle values of CNT, OPV (Formula 1, R=$C_{16}H_{33}$) and OVP/CNT composite

| — | CNT | OPV | COMPOSITE |
| --- | --- | --- | --- |
| Contact angle | 128° ± 5° | 106° ± 3° | 165° ± 2° |

Use/Application

The superhydrophobic surfaces of the current invention are optionally used in a huge number of different applications. Basically whenever a superhydrophobic surface is desired, the current invention can optionally be utilized. It will be appreciated, therefore, that specific uses/method/etc. claimed or described here are illustrative, but not limiting. Thus, other non-described uses/methods comprising the current nanocomposite and/or their usage are also features of the invention.

A number of valuable applications for the invention rely upon the ability of the substrate surfaces of the invention to easily shed or slide water off the surface. For example, when a surface is frequently or continuously flowed over by water, the substrate of the invention can be used to substantially reduce any viscous drag through such conduits thus dramatically reducing power requirements for transferring fluids from one level to another. Similarly marine vessels can be coated with the materials described in the invention at the point of interface with the water, to reduce the level of viscous grag on that interface, such a reduction in drag will decrease the reduction of cost of transport and increase the fuel efficiency and increased speed, the material described herein can be created over different surfaces e.g. the hull of a boat and many other applications.

The material described herein can be used optionally as self-cleaning surfaces, since due to the movement of water beads over the composite surface can optionally pick up deposited dirt, etc. Thus the present material can be used over aircraft surfaces, especially the wings, satellite-warps, sidings, etc.

Other application of the invention comprises, use to clear snow or ice or water build up on structures, for example plane bodies, antennas, telecommunication dishes, road signs, etc. to stay ice/snow/water free.

Application involving such constructs as barrier layers for transporting water through canals and water pipes, micro fluidic device, etc.

Similar application can optionally provide anti-fouling surfaces that prevent mold/mildew formation in humid area. Thus, embodiments of the invention can be used to prevent/reduce intrusion of water into an area.

The current invention can be optionally used in printing. For example superhydrophobic areas can optionally provide a method of printing or transferring ink in a desired pattern. The ink would tend to position itself on the hydrophobic and hydrophilic regions. Using superhydrophobic patterns provides the advantage that the superhydrophobic areas are likely to have very little contaminator from the ink and could be used with different compounds with less contamination.

The above are illustrative of various uses/applications of the superhydrophobic carbon nanotube coatings of the invention. Again, the enumeration of the specific embodiments herein not to be taken as necessarily limiting on the other non-detailed uses/applications which comprise the superhydrophobic surface of the current invention. Those of skill in art will appreciate other possible application and uses of the superhydrophobic surfaces and methods herein.

ADVANTAGES

The main advantages of the present system include:
1. The dispersion of CNT in common organic solvents with the aid of OPV is far simple and can be done at ambient conditions.
2. These composites form a stable solution in common organic solvents like toluene, chloroform, even in hydrocarbon solvents like decane, hexane, petrol, diesel or kerosene.
3. The formation of the binary structure from micrometer level to nanometer level results in the superhydrophobic self-cleaning surface which can be prepared easily by drop casting the composite solution over glass or metallic surface.
4. It shows superhydrophobicity even with corrosive liquids such as aqueous solutions of acidic as well as basic from pH 1 to 14.
5. Easy movement of water drops over the superhydrophobic surface shows it is extremely difficult to wet the composite surface and its water contact angle remains constant even after in continuous contact with water.

We claim:

1. Nanocomposite material useful for superhydrophobic coating comprising carbon nanotubes (CNT) and oligo (p-phenylenevinylene) (OPV) of general formula 1

Formula 1 wherein R = $C_{16}H_{33}$ or $C_{12}H_{25}$ or $C_8H_{17}$

2. Nanocomposite material as claimed in claim 1 wherein the material has the following characteristics:
   a) solid to liquid phase transition temperature is in the range of 110°-115° C.;
   b) liquid to solid phase transition temperature is in the range of 96°-98° C.;
   c) contact angle in nanocomposite superhydrophobic coating with water or other corrosive liquid is in the range of 150°-167°.

3. Nanocomposite material as claimed in claim 1, wherein the carbon nanotubes used are multi-walled carbon nanotubes having diameter in the range of 110-170 nm.

4. Nanocomposite material as claimed in claim 1 wherein oligo(p-phenylenevinylene) (OPV) used is selected from the group consisting of 2,2-(1E,1'E)-2,2'-(2,5-bishexadecyloxy)-1,4-phenylene)bis(ethene-2,1-diyl)bis(1,4-bis(hexadecyloxy)benzene (OPV($C_{16}H_{33}$), 2,2-(1E,1'E)-2,2'-(2,5-bis-dodecyloxy)-1,4-phenylene)bis(ethene-2,1-diyl)bis(1,4-bis (dodecyloxy)benzene (OPV($C_{12}H_{25}$) and 2,2-(1E,1'E)-2,2'-(2,5-bisoctyloxy)-1,4-phenylene) bis (ethene-2,1-diyl)bis(1,4-bis(octyloxy)benzene (OPV($C_8H_{17}$).

5. A process for the preparation of a superhydrophobic coating, the said process comprising the steps of:
   i) preparing a solution of oligo(p-phenylenevinylene) (OPV) of general formula 1 in an organic solvent under heating, at a temperature in the range of 35°-45° C.

Formula 1 wherein R = $C_{16}H_{33}$ or $C_{12}H_{25}$ or $C_8H_{17}$ ii) dispersing the carbon nanotubes into the above said solution of oligo(p-phenylenevinylene) (OPV) obtained in step (i) by sonication, followed by the centrifugation of the resultant suspension and decanting the resultant supernatant liquid, iii) applying vacuum to the above said supernatant liquid obtained in step (ii) at a temperature of 20°-30° C. to obtain the solid nanocomposite material, iv) dispersing the above said nanocomposite material in an organic solvent and v) spin coating or drop casting of the above said dispersion solution of nanocomposite material over the surface of a substrate to obtain the desire superhydrophobic coating.

6. A process as claimed in claim 5 wherein the carbon nanotubes used are multi-walled carbon nanotubes having diameter in the range of 110-170 nm.

7. A process as claimed in claim 5 wherein the oligo(p-phenylenevinylene) (OPV) used is selected from the group consisting of 2,2-(1E,1'E)-2,2'-(2,5-bishexadecyloxy)-1,4-phenylene)bis(ethene-2,1-diyl) bis (1,4-bis (hexa decyloxy) benzene (OPV($C_{16}H_{33}$), 2,2-(1E,1'E)-2,2'-(2,5-bisdodecyloxy)-1,4-phenylene)bis(ethene-2,1-diyl)bis(1,4-bis (dodecyloxy)benzene (OPV($C_{12}H_{25}$) and 2,2-(1E,1'E)-2,2'-(2,5-bisoctyloxy)-1,4-phenylene)bis(ethene-2,1-diyl)bis(1, 4-bis(octyloxy)benzene (OPV($C_8H_{17}$).

8. A process as claimed in claim 5 wherein the organic solvent used is selected from the group consisting of aliphatic and aromatic hydrocarbon solvents.

9. A process as claimed in claim 8 wherein the hydrocarbon solvent used is selected from the group consisting of hexane, decane, petrol, diesel and kerosene.

10. A process as claimed in any one of claims 5 or 8 wherein the organic solvent used is selected from the group consisting of chloroform and toluene.

11. A process as claimed in claim 5 wherein the weight ratio of oligo(p-phenylenevinylene) (OPV) to carbon nanotubes used is in the range of 40-60 wt %.

12. A process as claimed in claim 5 wherein the substrate used for coating is selected from the group consisting of metallic, glass, mica, ceramics, semi-conducting materials and combinations thereof.

* * * * *